United States Patent
Laermer et al.

(10) Patent No.: US 8,332,092 B2
(45) Date of Patent: Dec. 11, 2012

(54) METHOD FOR DETECTING THE STATE OF A TIRE

(75) Inventors: Franz Laermer, Weil der Stadt (DE); Thorsten Pannek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 12/227,368

(22) PCT Filed: Apr. 23, 2007

(86) PCT No.: PCT/EP2007/053931
§ 371 (c)(1),
(2), (4) Date: Nov. 14, 2008

(87) PCT Pub. No.: WO2007/147662
PCT Pub. Date: Dec. 27, 2007

(65) Prior Publication Data
US 2009/0210111 A1   Aug. 20, 2009

(30) Foreign Application Priority Data
Jun. 21, 2006   (DE) .................. 10 2006 028 411

(51) Int. Cl.
*G01M 17/02*   (2006.01)
(52) U.S. Cl. ..................... 701/29.1; 340/443
(58) Field of Classification Search .............. 701/1, 29, 701/29.5, 29.1; 340/442–448; 702/189; 73/146, 146.2
See application file for complete search history.

(56) References Cited

U.S. PATENT DOCUMENTS

| | | | | |
|---|---|---|---|---|
| 4,574,267 A | * | 3/1986 | Jones | 340/443 |
| 4,741,207 A | * | 5/1988 | Spangler | 73/146 |
| 5,123,497 A | * | 6/1992 | Yopp et al. | 180/422 |
| 5,295,087 A | * | 3/1994 | Yoshida et al. | 703/6 |
| 5,497,657 A | * | 3/1996 | Taguchi et al. | 73/146.2 |
| 5,557,552 A | * | 9/1996 | Naito et al. | 702/148 |
| 5,569,848 A | * | 10/1996 | Sharp | 73/146.2 |
| 5,573,610 A | * | 11/1996 | Koch et al. | 152/152.1 |
| 5,573,611 A | * | 11/1996 | Koch et al. | 152/152.1 |
| 5,586,028 A | * | 12/1996 | Sekine et al. | 701/1 |
| 5,749,984 A | | 5/1998 | Frey et al. | |
| 5,827,957 A | * | 10/1998 | Wehinger | 73/146.3 |
| 5,839,082 A | * | 11/1998 | Iwasaki | 701/38 |
| 5,852,243 A | * | 12/1998 | Chang et al. | 73/659 |
| 6,014,595 A | * | 1/2000 | Kobayashi | 701/1 |
| 6,278,361 B1 | * | 8/2001 | Magiawala et al. | 340/438 |
| 6,304,802 B1 | * | 10/2001 | Stuible et al. | 701/29 |
| 6,317,667 B1 | * | 11/2001 | Oshiro | 701/29 |
| 6,397,133 B1 | * | 5/2002 | van der Pol et al. | 701/37 |
| 6,538,566 B1 | * | 3/2003 | Morand et al. | 340/444 |
| 6,539,295 B1 | * | 3/2003 | Katzen et al. | 701/29 |
| 6,594,558 B1 | * | 7/2003 | Schmitt | 701/1 |

(Continued)

FOREIGN PATENT DOCUMENTS

DE   198 07 004   9/1999

(Continued)

*Primary Examiner* — Darnell Jayne
*Assistant Examiner* — Sasha T Varghese
(74) *Attorney, Agent, or Firm* — Kenyon & Kenyon LLP

(57) ABSTRACT

A method for detecting the state of a vehicle tire and/or a roadway, in which at least one sensor, in particular an acceleration sensor, disposed in the tire interior generates a signal that is assigned to physical variables of the vehicle tire and/or the roadway. A tire state and/or characteristics of the roadway are/is determined on the basis of the signal.

12 Claims, 2 Drawing Sheets

U.S. PATENT DOCUMENTS

| | | | |
|---|---|---|---|
| 6,759,952 B2 * | 7/2004 | Dunbridge et al. | 340/444 |
| 6,774,779 B2 * | 8/2004 | Lin | 340/447 |
| 6,885,292 B2 * | 4/2005 | Katou | 340/445 |
| 7,032,436 B2 | 4/2006 | Yokota et al. | |
| 2002/0108435 A1 * | 8/2002 | Hartmann et al. | 73/146 |
| 2004/0138831 A1 * | 7/2004 | Watanabe et al. | 701/70 |
| 2004/0187577 A1 * | 9/2004 | Higuchi et al. | 73/514.29 |
| 2004/0199300 A1 * | 10/2004 | Gustafsson et al. | 701/1 |
| 2005/0044945 A1 * | 3/2005 | Hammerschmidt | 73/146.3 |
| 2005/0057348 A1 * | 3/2005 | Hammerschmidt | 340/445 |
| 2005/0085987 A1 * | 4/2005 | Yokota et al. | 701/80 |
| 2005/0097949 A1 * | 5/2005 | Hillenmayer et al. | 73/146 |
| 2005/0150283 A1 * | 7/2005 | Shick et al. | 73/146 |
| 2005/0188754 A1 * | 9/2005 | Ogawa | 73/146 |
| 2005/0246142 A1 * | 11/2005 | Hammerschmidt | 702/189 |
| 2005/0248446 A1 * | 11/2005 | Watabe et al. | 340/447 |
| 2007/0088477 A1 * | 4/2007 | Brewer et al. | 701/41 |
| 2008/0015763 A1 * | 1/2008 | Kitazaki et al. | 701/70 |
| 2009/0115590 A1 * | 5/2009 | Brusarosco et al. | 340/444 |

FOREIGN PATENT DOCUMENTS

| | | |
|---|---|---|
| JP | 2003-54229 | 2/2003 |
| JP | 2006-142991 | 6/2006 |
| WO | WO 01/98123 | 12/2001 |

* cited by examiner

METHOD FOR DETECTING THE STATE OF A TIRE

FIELD OF THE INVENTION

The present invention relates to a device, a method, and a computer program for detecting the state of a vehicle tire and/or a road, in which at least one sensor, in particular an acceleration sensor, disposed inside the tire generates a signal that is assigned to physical variables of the vehicle tire and/or the road.

BACKGROUND INFORMATION

It is known to use devices inside the vehicle for the purpose of monitoring the state of the tires, in particular for monitoring the air pressure in tires. These devices include a stationary device, which cooperates with a device that is moving together with the individual wheel of the vehicle, so that the air pressure can be monitored while the vehicle is in operation. The device moving together with the wheel senses the air pressure with the aid of a suitable arrangement and transmits the measured values by a clockless signal to the stationary device, which informs the driver if the air pressure drops below a specific value.

Current systems for tire monitoring are designed to monitor only the tire pressure and therefore often include a pressure sensor for measuring the pressure inside the tire; its measured values are transmitted to a stationary control device in the vehicle in a suitable manner, in particular in a wireless manner, by telemetry. More recent developments focus on systems that are integrated into the tire, in which the sensors, telemetry and energy production are vulcanized directly into the tire. Such systems require a pressure sensor and a signal-transmission arrangement. The known systems for determining the tire pressure are expensive and tend to be unreliable, especially in the aggressive environment of a vehicle tire.

As a result, there is the need for a more capable system for monitoring the tire pressure, which supplies meaningful information not only about the tire pressure but also about the material characteristics of the tire and possibly about the road characteristics.

SUMMARY OF THE INVENTION

Therefore, it is an object of the exemplary embodiments and/or exemplary methods of the present invention to provide a method, a device and a computer program for detecting the state of a vehicle tire and/or a roadway, by which a high-performance system for determining the tire and road characteristics is able to be realized in a simple and cost-effective manner and with high reliability.

This problem is solved by a method for detecting the state of a vehicle tire and/or a roadway, in which at least one sensor, in particular an acceleration sensor, disposed in the interior of the tire generates a signal that is assigned to physical variables of the vehicle tire and/or the roadway, and a tire state and/or characteristics of the roadway, in particular the road surface, are/is determined with the aid of the signal. To this end, the time spans of the travel of the "free" circumference of the tire (T-τ), and the area of contact with the road τ are precisely recorded with the aid of the acceleration signals and analyzed, T being the cycle duration. Important in this context is only the change from a large acceleration signal to a relatively small signal or to a noisy, quickly fluctuating signal, which characterizes the contact of the acceleration sensor with the road.

Due to the approach according to the exemplary embodiments and/or exemplary methods of the present invention, the signal component that is decisive for the tire state and for the road state, i.e., the signal component during which the sensor is rolling on the road, is determined in a simple and cost-effective manner and then analyzed. This makes it possible to obtain information about critical tire characteristics and specific roadway characteristics via an analysis carried out over the time.

It may be provided that the sensor generates a signal which represents periodically alternating phases of a centripetal acceleration; in those phases in which the signal undershoots a lower limit value (is virtually equal to zero), the signal is assigned to a physical variable representing the tire state and/or the characteristics of the roadway, especially the road surface. The lower limit value is selected in such a way that the signal strength is considerably lower than in those phases in which the acceleration sensor is not in the region of the contact surface with the road. This filters out the time range during which the acceleration sensor is at the contact surface with the road. The acceleration sensor may be affixed inside the running surface of the tire in such a way that its use makes it possible to detect periodically alternating phases of a centripetal acceleration. During those phases in which the centripetal acceleration is virtually zero, the acceleration sensor determines acceleration signals, which are conveyed to an evaluation device provided inside the vehicle tire or in the vehicle interior, and a display arrangement is provided, which indicates the state of the tire and/or the roadway in response to a signal from the evaluation device.

A signal spectrum may be obtained from the signal, the determined signal spectrum at least partially including vibrations that are generated by the movement of a section of the running surface of the vehicle tire adjacent to the acceleration sensor when rolling on the road pavement. It is advantageous in this context that the signal spectrum determined by the acceleration sensor includes all vibrations that are generated by the movement of a part of the outer running surface of the vehicle tire that is adjacent to the acceleration sensor when rolling on the road. This may be both acceleration values in the radial direction and/or those parallel to the road or the driving direction.

The signal spectrum may be filtered, and the signal components determined in the process are analyzed with regard to their signal strength in order to obtain quantitative information regarding the state of the tire and/or the roadway. This analysis may be implemented with the aid of filter components, which are dynamically adaptable to the wheel speed, or with the aid of a Fourier analyzer. A Fourier analysis or some other type of spectral filtering and signal-strength analysis is implementable inside the tire or centrally in the control device in the vehicle. Prior to the transmission to the central control device, it is advantageous to compress the data in a suitable manner in order to reduce the data quantity.

It may be provided to assign a setpoint signal strength and a setpoint frequency spectrum of the signal spectrum to a vehicle tire or a tire profile, and to determine an actual signal strength and an actual frequency spectrum of the signal spectrum and, by a comparison to the setpoint signal strength and the setpoint frequency spectrum, in order to determine a profile height and material characteristics of the vehicle tire therefrom. The setpoint signal strength and the setpoint frequency spectrum are characteristic variables of the particular vehicle tire or the tire type or the model series of the tire. In the process, the profile height and the material characteristics of the vehicle tire are determined on the basis of the signal strength and the frequency spectrums of the signals characteristic of the tire profile; the road characteristics, in particular irregularities, are able to be determined on the basis of low-frequency signal components recorded by the acceleration sensor. Via a loss of corresponding spectral signal strength, even up to the complete disappearance of a profile-dependent signal component, the profile height is able to be estimated, i.e., insufficient depth of the tire profiles may be detected. Furthermore, the material characteristics, i.e., the elasticity of the rubber, are able to be estimated, so that signs of wear and embrittlement are detectable in a timely manner. Distortions of the tire may be detected at least in those instances where they pertain to the environment of the acceleration sensor. The rolling behavior on the road is likewise able to be analyzed.

It is especially advantageous that the road characteristics, in particular obstructions and uneven areas, are able to be determined on the basis of signal components detected by the acceleration sensor. Furthermore, a rough estimate of the road state is able to be made; more specifically, a very quiet (smooth) roadway may provide an early indication of dangerous water accumulations or ice formation on the road.

A tire pressure in the vehicle tire may be determined with the aid of the signal. The acceleration sensor is utilized to record measured values and is oriented inside the tire in such a way that it determines a centripetal acceleration and/or acceleration values in a direction parallel to the road or to the driving direction. Absolute values, or an acceleration sensor measuring in an absolute and precise manner, are not actually required for this purpose. Instead, as previously pointed out already, it is only the change from a large signal to a small signal close to 0 or a change to a noisy, rapidly fluctuating signal that is important. Thus, the actually relevant measured variable for the tire pressure is a determined time ratio of the duration of a small signal to a large signal ($\tau/T$). If this ratio becomes greater over time, then this may be interpreted in the generally known manner as a critical tire pressure reduction at a certain rate.

The problem mentioned in the introduction is also solved by a device for detecting the state of a vehicle tire and/or a roadway, in which at least one sensor disposed in the interior of the tire, in particular an acceleration sensor, generates a signal that is assigned to physical variables of the vehicle tire and/or the roadway, characterized in that a tire state and/or roadway characteristic are/is determined with the aid of the signal. In this context it may be provided that the signal is forwarded to an evaluation device provided inside the vehicle tire or in the vehicle interior, wherein at least one display arrangement is disposed in the vehicle, which indicates the state of the tire and/or roadway in response to a signal from the evaluation device. Furthermore, it may be provided that the acceleration sensor is designed as piezoelectric transformer element and is vulcanized into the vehicle tire. In the process, the acceleration sensor is fixed in place inside the interior of the running surface of the tire in such a way that periodically alternating phases of a centripetal acceleration $a_z$ are detected by the acceleration sensor, and in the phases during which the centripetal acceleration is virtually 0, the acceleration sensor determines acceleration signals, which are forwarded to an evaluation device provided inside the vehicle tire or in the vehicle interior. A display arrangement may be provided, which displays the state of the tires and/or the roadway in response to a signal from the evaluation device.

The problem mentioned in the introduction is also solved by a computer program having program code for implementing the method as recited in one of the method claims when the program is executed on a computer or microcontroller or processor.

An exemplary embodiment of the present invention is explained in detail in the following text with reference to the accompanying drawing.

DETAILED DESCRIPTION

Figure 1:
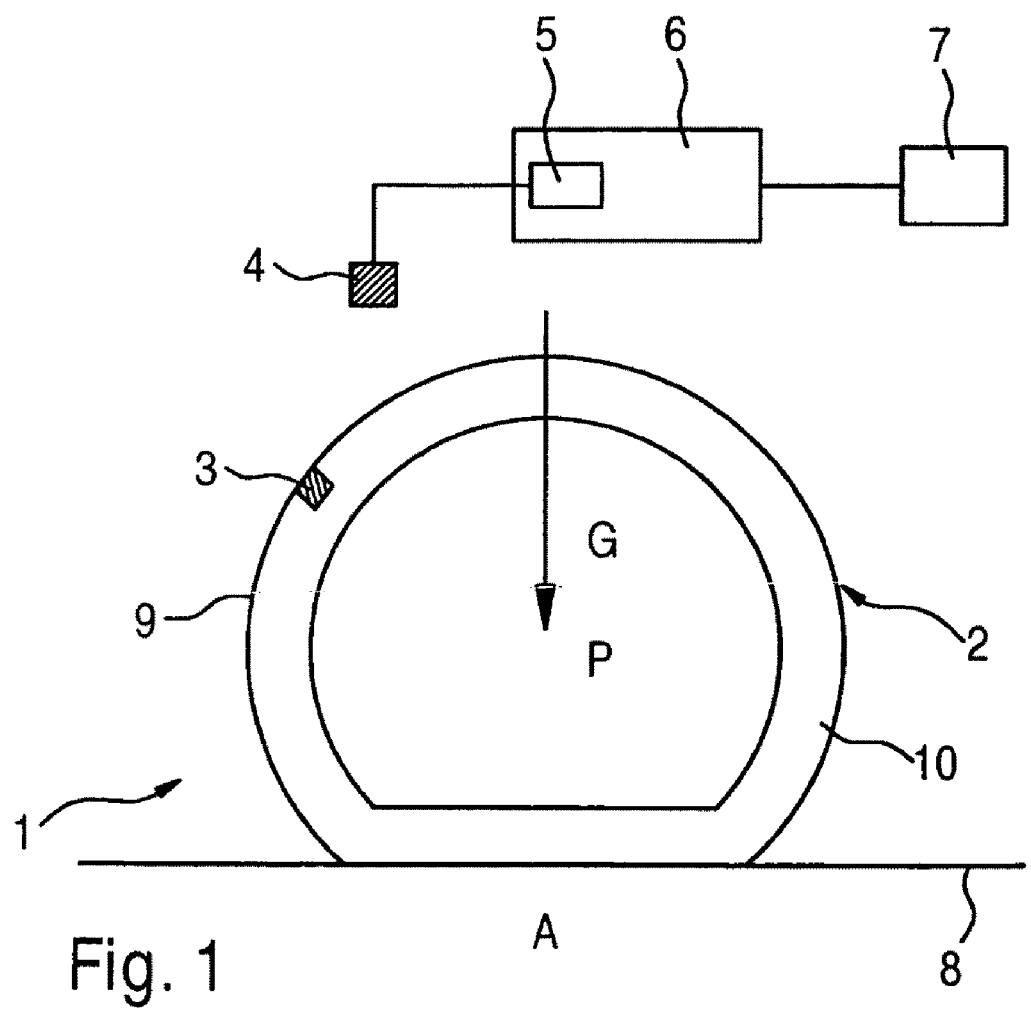
FIG. 1 shows a basic representation of a vehicle wheel, which is resting on area A on the road.

FIG. 1 shows a simplified representation of a vehicle wheel 1 having a vehicle tire 2, in the form of a sketch. Vehicle tire 2 includes a rolling surface 9 and a tire interior 10, which usually is filled with air. Disposed in tire interior 10 of vehicle tire 2 is an acceleration sensor 3, which transmits an electromagnetic signal to an evaluation device 5 via a sensing element 4 that is permanently mounted on the axle or vehicle body, for example. Evaluation device 5 is part of a control device 6, which is connected to display device 7 in the visual field of a driver in a motor vehicle. Vehicle tire 2 rolls on a road 8. The road has a surface finish that is characterized by the material of the surface and its physical properties, in particular. Among them are also uneven areas in the form of waves, grooves or foreign bodies, for example. Deposits such as water, for example, on the surface also change the contact between tire and road surface.

It is known that the weight of the vehicle is distributed to the wheels, each wheel having to support partial weight G of the vehicle via area A of the road contact, as shown in the basic representation. The relationship between tire pressure p and partial weight G as well as contact surface A is given by the formula: $G=p*A$. Tire pressure p thus supports this weight G due to a contact surface A of the tire on the roadway. The length of contact surface A is the decisive variable based on which a decision is made as to whether the tire is operated "correctly" or "incorrectly" on the vehicle. The correct contact surface is adjusted via tire pressure p in a manner known per se. If tire pressure p is too low, contact area A becomes too large and the tire will be flexed too heavily. This would lead to overheating and excess wear and fuel consumption. However, if tire pressure p is too high, then the contact area is too small, and the force transmission between tire and road thus is not optimal, which could have a detrimental effect on an acceleration, for instance, or on a braking maneuver. If the vehicle is subjected to additional loading or relieved of such, the tire pressure must generally be increased or lowered, respectively, in order to readjust the correct tire/road contact surface.

The length of contact area A in the driving direction, or its relative portion in relation to the overall circumference of the tire, is determined with the aid of an acceleration measurement. While the acceleration sensor runs through the particular part of the path that corresponds to the tire circumference, it determines the centripetal acceleration, which usually assumes a magnitude of 10 g up to some 100 g. When the acceleration sensor runs through the particular part of the path that corresponds to contact surface A with the road, the acceleration signal is virtually 0, or vibrations or interference of the road pavement are determined, that is, a very irregular, rapidly fluctuating and relatively small acceleration signal in any event. This signal contains information about the state of the tire and the roadway.

Figure 2:
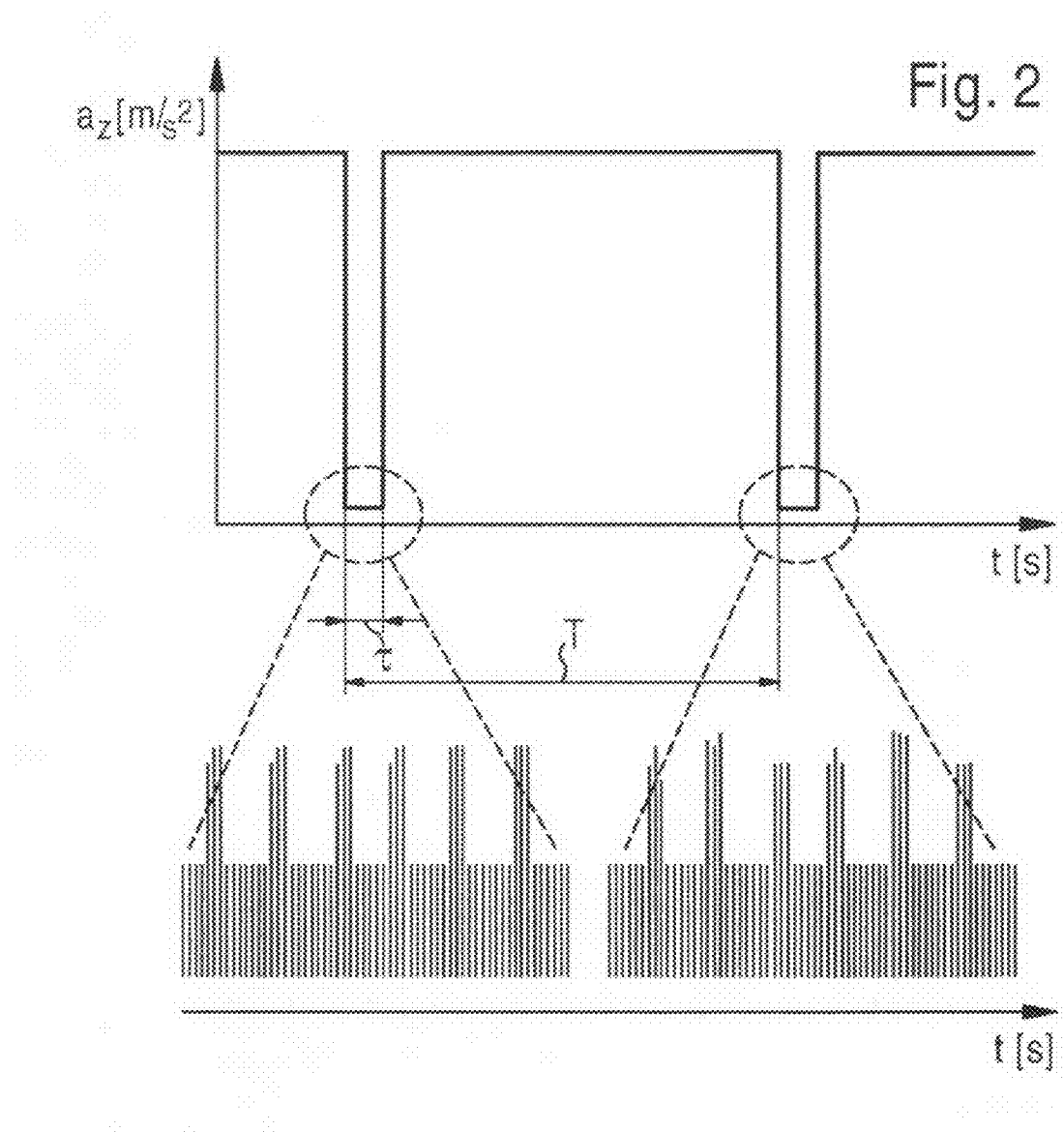
FIG. 2 shows a diagram in which the characteristic of the centripetal acceleration is graphically illustrated with regard to the time.

FIG. 2 shows a diagram in which the dependency of a centripetal acceleration $a_z$, i.e., the acceleration perpendicular to the tire circumference, from time t is shown in the form of a graph. This curve results for a nearly point-shaped or relatively small acceleration sensor, which is mounted on the inside of the tire's running surface. Centripetal acceleration $a_z$ on the tire circumference results directly from the wheel rotation and the tire radius, i.e., the distance: center point of the axle to the tire surface in which the measurement is taking place. The value of the centripetal acceleration is:

$$a_z=\omega^2 r,$$

r being the tire radius, and ω being the current rotational speed of the tire. It can be gathered from the diagram that relatively long phases with high values of the centripetal acceleration periodically alternate with relatively short phases with relatively low acceleration, which occur when the acceleration sensor is in contact with the road surface. The short phases are thus the phases in which the acceleration sensor "is rolling on the road surface". The time spans of the passing through the "free" circumference (T-τ) and the contact area with roadway τ are precisely recorded with the aid of the acceleration signals. The ratio of the measured times τ/T reflects the ratio of the longitudinal extension of contact area A to the overall circumference of the tire:

$$1.A/2\pi r=\tau/T.$$

During the short phases the acceleration sensor determines signals that are partially characteristic of the road surface, but partially also of the tire and its properties. As can be gathered from FIG. 2, a signal spectrum that includes all vibrations that are produced by the movement of the part of the running surface of the vehicle tire adjacent to the acceleration sensor while rolling on the road is determined during these phases. This spectrum contains a periodicity that results from the tire profile, i.e., the grooves and protuberances periodically introduced in the tire. This change in the profile height generates a characteristic noise having frequencies that result from the groove or profile clearance and the rotational speed of the tire or the rolling speed on the road and also from the profile height. It is obvious that a greater profile height generates stronger signals than a low profile height in this instance. Furthermore, these vibrations are also a function of the elastic properties of the tire rubber. Changes in elasticity also change the vibration response and thus the signal strengths and frequency spectrums of the signals that are characteristic of the tire profile, i.e., spectrally in the frequencies that, within the sense of their creation, have the tire profile as their source during the rolling movement.

As can be gathered from FIG. 2, the signal from the acceleration sensor is made up of a series of spectral components that, when related to each other, allow inferences with regard to the state of the tires and the roadway. The sensor signal includes slower signal components that result from irregularities of the road, e.g., from a cobblestone pavement, which produces a periodic pattern and thus generates characteristic frequencies from both the rolling speed and the tire. These frequencies have a considerably lower frequency than the signal components arising from the tire profiles, since the characteristic distances on the pavement are usually greater than the profile clearances on the tire's running surface. Such pavement periods may even be greater than the rolling surface of the tire on the pavement and may then often not even be noticeable any longer. Furthermore, non-periodic, "spontaneous" signal components may be included, such as from obstacles, cracks, stones or other uneven spots etc. on the pavement, which lead to chaotic or spontaneous tire noise. On a sandy foundation, a noise component is added, that is to say, driving on the fine-grained surface generates acceleration signals or noise in the tire that corresponds to a noise signal. These acceleration signals may be ascertained both in a radial direction and in the driving direction and/or parallel to the road, as well.

In a device according to the exemplary embodiments and/or exemplary methods of the present invention, the use of one or a plurality of acceleration sensors, which may be embodied as piezoelectric transformer element, makes it possible to obtain not only information about critical tire and roadway characteristics, but also to monitor the correct tire pressure and to obtain the energy required by the system within the meaning of "power harvesting". There is additional expense only with regard to the evaluation electronics, in that during the rolling phases of the acceleration sensor on the road, the particular frequency components that are characteristic of the tire behavior and certain pavement characteristics must be evaluated individually and according to their spectral strength with the aid of spectral filters or a Fourier analysis.

However, instead of a single component, it is also conceivable to use a plurality of components, i.e., a separate acceleration sensor, e.g., a surface micromechanics Si sensor or piezoelectric sensor, for the tire pressure, a separate acceleration sensor, e.g., a surface micromechanics Si sensor or piezoelectric sensor, for the acceleration characteristic during the rolling, i.e., during the rolling phases, and also a "power harvester", e.g., a piezoelectric or other type of generator, for the energy generation in the tire from vibrations. It is especially advantageous in this instance that all of these components may be accommodated in a single subassembly. Each of the acceleration sensors may detect different acceleration directions, i.e., parallel to the road, and/or perpendicular to the road in the radial direction.

What is claimed is:

1. A computer-implemented method of a tire monitoring system having at least one computer processor for detecting a state of a vehicle tire and a roadway, the method comprising:
generating, using at least one acceleration sensor disposed in a tire interior, a signal that represents periodically alternating phases of a centripetal acceleration and is assigned to physical variables of the vehicle tire and the roadway in those phases in which the signal drops below a lower limit value; and
determining a tire state and characteristics of the roadway based on the signal; wherein a signal spectrum is obtained from the signal, and wherein the determined signal spectrum at least partially includes vibrations that are generated by a movement of a part of a running surface of the vehicle tire adjacent to the acceleration sensor when rolling on the roadway;
wherein a vehicle tire is assigned a setpoint signal strength and a setpoint frequency spectrum of the signal spectrum, and an actual signal strength and an actual frequency spectrum of the signal spectrum are determined, and a profile height and material characteristics of the vehicle tire are determined by a comparison of the actual signal strength with the setpoint signal strength and the actual frequency spectrum with the setpoint frequency spectrum.

2. The method of claim 1, wherein the signal spectrum is filtered, and signal components determined in the process are analyzed according to their signal strength in order to obtain quantitative information with regard to the state of the tire and the roadway.

3. The method of claim 1, wherein a tire pressure in the vehicle tire is determined based on the signal.

4. A device for detecting a state of a vehicle tire and a roadway, comprising:
  at least one acceleration sensor, disposed in a tire interior generating a first signal that represents periodically alternating phases of a centripetal acceleration and is assigned to physical variables of the vehicle tire and the roadway in those phases in which the first signal drops below a lower limit value, wherein a tire state and characteristics of the roadway are determined based on the first signal, and wherein a signal spectrum is obtained from the first signal, and wherein the determined signal spectrum at least partially includes vibrations that are generated by a movement of a part of a running surface of the vehicle tire adjacent to the acceleration sensor when rolling on the roadway;
  wherein a vehicle tire is assigned a setpoint signal strength and a setpoint frequency spectrum of the signal spectrum, and an actual signal strength and an actual frequency spectrum of the signal spectrum are determined, and a profile height and material characteristics of the vehicle tire are determined by a comparison of the actual signal strength with the setpoint signal strength and the actual frequency spectrum with the setpoint frequency spectrum.

5. The device of claim 4, wherein the first signal is forwarded to an evaluation device provided inside the vehicle tire or in a vehicle interior, at least one display arrangement being disposed in the vehicle, which indicates the state of the tire and the roadway in response to a second signal from the evaluation device.

6. The device of claim 4, wherein the acceleration sensor is a piezoelectric transformer element and is vulcanized into the vehicle tire.

7. A non-transitory computer readable medium having a computer program executable on a processor, comprising:
  a program code arrangement having program code for detecting a state of a vehicle tire and a roadway by performing the following:
  generating, using at least one acceleration sensor disposed in a tire interior, a signal that represents periodically alternating phases of a centripetal acceleration and is assigned to physical variables of the vehicle tire and the roadway in those phases in which the signal drops below a lower limit value; and
  determining the tire state and characteristics of the roadway based on the signal; wherein a signal spectrum is obtained from the signal, and wherein the determined signal spectrum at least partially includes vibrations that are generated by a movement of a part of a running surface of the vehicle tire adjacent to the acceleration sensor when rolling on the roadway;
  wherein a vehicle tire is assigned a setpoint signal strength and a setpoint frequency spectrum of the signal spectrum, and an actual signal strength and an actual frequency spectrum of the signal spectrum are determined, and a profile height and material characteristics of the vehicle tire are determined by a comparison of the actual signal strength with the setpoint signal strength and the actual frequency spectrum with the setpoint frequency spectrum.

8. The computer readable medium of claim 7, wherein the signal spectrum is filtered, and signal components determined in the process are analyzed according to their signal strength in order to obtain quantitative information with regard to the state of the tire and the roadway.

9. The computer readable medium of claim 7, wherein a tire pressure in the vehicle tire is determined based on the signal.

10. A computer-implemented method of a tire monitoring system having at least one computer processor for detecting a state of a vehicle tire and a roadway, the method comprising:
  generating, using at least one acceleration sensor disposed in a tire interior, a signal that represents periodically alternating phases of a centripetal acceleration and is assigned to physical variables of the vehicle tire and the roadway in those phases in which the signal drops below a lower limit value; and
  determining the tire state and characteristics of the roadway based on the signal; wherein a signal spectrum is obtained from the signal, and wherein the determined signal spectrum at least partially includes vibrations that are generated by a movement of a part of a running surface of the vehicle tire adjacent to the acceleration sensor when rolling on the roadway,
wherein the signal spectrum is filtered, and signal components determined in the process are analyzed according to their signal strength in order to obtain quantitative information with regard to the state of the tire and the roadway, and
  wherein a vehicle tire is assigned a setpoint signal strength and a setpoint frequency spectrum of the signal spectrum, and an actual signal strength and an actual frequency spectrum of the signal spectrum are determined, and a profile height and material characteristics of the vehicle tire are determined by a comparison of the actual signal strength with the setpoint signal strength and the actual frequency spectrum with the setpoint frequency spectrum.

11. A device for detecting a state of a vehicle tire and a roadway, comprising:
  at least one acceleration sensor, disposed in a tire interior generating a first signal that represents periodically alternating phases of a centripetal acceleration and is assigned to physical variables of the vehicle tire and the roadway in those phases in which the first signal drops below a lower limit value, wherein a tire state and characteristics of the roadway is determined based on the first signal;
  wherein a signal spectrum is obtained from the signal, and wherein the determined signal spectrum at least partially includes vibrations that are generated by a movement of a part of a running surface of the vehicle tire adjacent to the acceleration sensor when rolling on the roadway,
wherein the signal spectrum is filtered, and signal components determined in the process are analyzed according to their signal strength in order to obtain quantitative information with regard to the state of the tire and the roadway, and
  wherein a vehicle tire is assigned a setpoint signal strength and a setpoint frequency spectrum of the signal spectrum, and an actual signal strength and an actual frequency spectrum of the signal spectrum are determined, and a profile height and material
characteristics of the vehicle tire are determined by a comparison of the actual signal strength with the setpoint signal strength and the actual frequency spectrum with the setpoint frequency spectrum.

12. A non-transitory computer readable medium having a computer program executable on a processor, comprising:
a program code arrangement having program code for detecting a state of a vehicle tire and a roadway by performing the following:
generating, using at least one acceleration sensor disposed in a tire interior, a signal that represents periodically alternating phases of a centripetal acceleration and is assigned to physical variables of the vehicle tire and the roadway in those phases in which the signal drops below a lower limit value; and
determining the tire state and characteristics of the roadway based on the signal; wherein a signal spectrum is obtained from the signal, and wherein the determined signal spectrum at least partially includes vibrations that are generated by a movement of a part of a running surface of the vehicle tire adjacent to the acceleration sensor when rolling on the roadway,
wherein the signal spectrum is filtered, and signal components determined in the process are analyzed according to their signal strength in order to obtain quantitative information with regard to the state of the tire and the roadway, and
wherein a vehicle tire is assigned a setpoint signal strength and a setpoint frequency spectrum of the signal spectrum, and an actual signal strength and an actual frequency spectrum of the signal spectrum is are determined, and a profile height and material characteristics of the vehicle tire are determined by a comparison of the actual signal strength with the setpoint signal strength and the actual frequency spectrum with the setpoint frequency spectrum.

* * * * *